(12) United States Patent
Grupp et al.

(10) Patent No.: US 10,787,322 B2
(45) Date of Patent: Sep. 29, 2020

(54) SYNCHRONIZED, HIGH EFFICIENCY PROVISIONING, HANDLING, AND EXCESS RECIRCULATION DESIGN

(71) Applicant: Siemens Industry, Inc., Alpharetta, GA (US)

(72) Inventors: Francisco Grupp, Trophy Club, TX (US); Michael D. Carpenter, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/100,280

(22) Filed: Aug. 10, 2018

(65) Prior Publication Data

US 2019/0055092 A1 Feb. 21, 2019

Related U.S. Application Data

(60) Provisional application No. 62/546,023, filed on Aug. 16, 2017.

(51) Int. Cl.
| | |
|---|---|
| *B65G 43/08* | (2006.01) |
| *B65G 47/31* | (2006.01) |
| *B65G 15/22* | (2006.01) |
| *B65G 47/51* | (2006.01) |
| *B65G 43/10* | (2006.01) |
| *B65G 47/14* | (2006.01) |

(52) U.S. Cl.
CPC ......... *B65G 47/5145* (2013.01); *B65G 43/08* (2013.01); *B65G 43/10* (2013.01); *B65G 47/1492* (2013.01); *B65G 47/31* (2013.01); *B65G 2201/0285* (2013.01); *B65G 2203/042* (2013.01)

(58) Field of Classification Search
None
See application file for complete search history.

(56) References Cited

U.S. PATENT DOCUMENTS

| | | | |
|---|---|---|---|
| 5,038,911 A | 8/1991 | Doane et al. | |
| 5,267,638 A | 12/1993 | Doane | |
| 5,341,916 A | 8/1994 | Doane et al. | |
| 6,269,933 B1 * | 8/2001 | Schuitema | B65G 47/5145 198/370.1 |
| 6,401,936 B1 * | 6/2002 | Isaacs | B65G 43/08 198/367.1 |
| 6,889,814 B2 * | 5/2005 | Cerutti | B07C 3/02 198/358 |
| 6,923,307 B2 * | 8/2005 | Haan | B65G 43/08 198/347.4 |

(Continued)

*Primary Examiner* — Kavel Singh (57) ABSTRACT

Parcel processing systems and methods. A parcel processing system includes a parcel transport configured to receive a flow of parcels, and transport the flow of parcels at a rate greater than a processing capacity of a downstream processing device. The parcel processing system includes a diverter configured to divert individual parcels from the flow of parcels to be recirculated. The parcel processing system includes the downstream processing device configured to process the remaining flow of parcels. The parcel processing system includes a control system configured to cause the diverter to divert the individual parcels from the flow of parcels until the remaining flow of parcels is not greater than the processing capacity of a downstream processing device.

17 Claims, 6 Drawing Sheets

(56) References Cited

U.S. PATENT DOCUMENTS

| | | |
|---|---|---|
| 7,090,067 B2 | 8/2006 | Schiesser et al. |
| 7,191,895 B2 | 3/2007 | Zeitler et al. |
| 7,413,071 B2 | 8/2008 | Zeitler et al. |
| 8,408,380 B2 | 4/2013 | Doane |
| 9,771,222 B2 * | 9/2017 | Schroader .......... G06K 9/00771 |

* cited by examiner

SYNCHRONIZED, HIGH EFFICIENCY PROVISIONING, HANDLING, AND EXCESS RECIRCULATION DESIGN

CROSS-REFERENCE TO OTHER APPLICATION

This application claims the benefit of the filing date of U.S. Provisional Patent Application 62/546,023, filed Aug. 16, 2017, which is hereby incorporated by reference.

TECHNICAL FIELD

Aspects of the present application generally relate to processing parcels, which can include any mail, package, flat, box, or similar object to be transported. In particular, aspects of the present application address automatic singulation, gapping, and high-speed induction of these parcels.

BACKGROUND OF THE DISCLOSURE

The common methods of singulation, gapping, and high-speed induction have severe inefficiencies. Improved systems and methods are desirable.

SUMMARY OF THE DISCLOSURE

Disclosed embodiments relate to systems and methods for synchronized, high efficiency provisioning, handling, and excess recirculation design, and other devices, systems, and methods as disclosed herein.

A parcel processing system includes a parcel transport configured to receive a flow of parcels, and transport the flow of parcels at a rate greater than the processing capacity of a downstream processing device. The parcel processing system includes a diverter configured to divert individual parcels from the flow of parcels to be recirculated. The parcel processing system includes the downstream processing device configured to process the remaining flow of parcels. The parcel processing system includes a control system configured to cause the diverter to divert the individual parcels from the flow of parcels until the remaining flow of parcels is not greater than the processing capacity of the downstream processing device.

A parcel processing method performed by a parcel processing system includes receiving a flow of parcels to be processed at a parcel transport. The method includes transporting the flow of parcels at a rate greater than a processing capacity of a downstream processing device. The method includes diverting individual parcels from the flow of parcels, by a diverter, until the rate of the flow of parcels is not greater than the processing capacity of the downstream processing device. The method includes recirculating the diverted individual parcels so that they reenter the flow of parcels prior to the diverting. The method includes processing the remaining flow of parcels by the downstream processing device.

Various embodiments include a non-transitory computer-readable medium storing executable instructions that, when executed, cause a control system of a parcel processing system to control the parcel processing system to perform methods as disclosed herein.

Various embodiments also include a gapper configured to gap the remaining flow of parcels to match a downstream synchronization requirement, wherein the control system is further configured to cause the diverter to divert the individual parcels from the flow of parcels until the remaining flow of parcels is not greater than can be gapped to match the downstream synchronization requirement. In various embodiments, the downstream processing device is a parcel sorter. In various embodiments, the control system is further configured to cause the diverter to divert the individual parcels from the flow of parcels until the rate of the remaining flow of parcels is not greater than can be gapped to match the downstream synchronization requirement. In various embodiments, the control system is further configured to determine when the rate of the flow of parcels is greater than can be gapped to match the downstream synchronization requirement. Various embodiments also include a singulator configured to singulate the flow of parcels. In various embodiments, the downstream synchronization requirement is a variable-rate, fixed gap flow of parcels. In various embodiments, the processing capacity of the downstream processing device is defined by a downstream synchronization requirement that is one of a fixed pitch of the flow of parcels or a fixed gap for the flow of parcels. Various embodiments can include processes or instructions to synchronize the remaining flow of parcels.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

As described above, common methods of singulation, gapping, and high-speed induction have severe inefficiencies. Disclosed embodiments address improvements in automatic provisioning of 3-dimensional goods to sorting systems, in particular with respect to singulation, gapping, and high-speed induction.

Known techniques for such processes are described, for example, in U.S. Pat. Nos. 7,191,895, 7,413,071, 8,408,380, 5,038,911, 5,267,638, 5,341,916, and 7,090,067, each of which is hereby incorporated by reference.

Current systems suffer reduced productivity because of the inherent inaccuracy of synchronization between the provisioning system and the downstream process requiring synchronized flow, such as a check weighing system or sorter. Synchronization is important for these downstream processes because of the need for items to arrive at certain positions at specific moments in time. Depending on the downstream process, those moments are determined by relationships between an item and the previous item, and the positions of items relative to one another and parts of the processing equipment. For this reason, synchronization is usually described in terms of the gap (the consistent, controlled distance from the trailing edge of an item being transported to the leading edge of the subsequent item being transported) and/or the pitch (the consistent, controlled distance between either the leading edge or centerline of an item being transported and the leading edge or centerline of the subsequent item being transported).

Gap or pitch are typically manipulated by creating a velocity boundary between two items, so that the items being transported move at different speeds, which changes the distances of both pitch and gap, as well as centerline to centerline distance.

Figure 1:
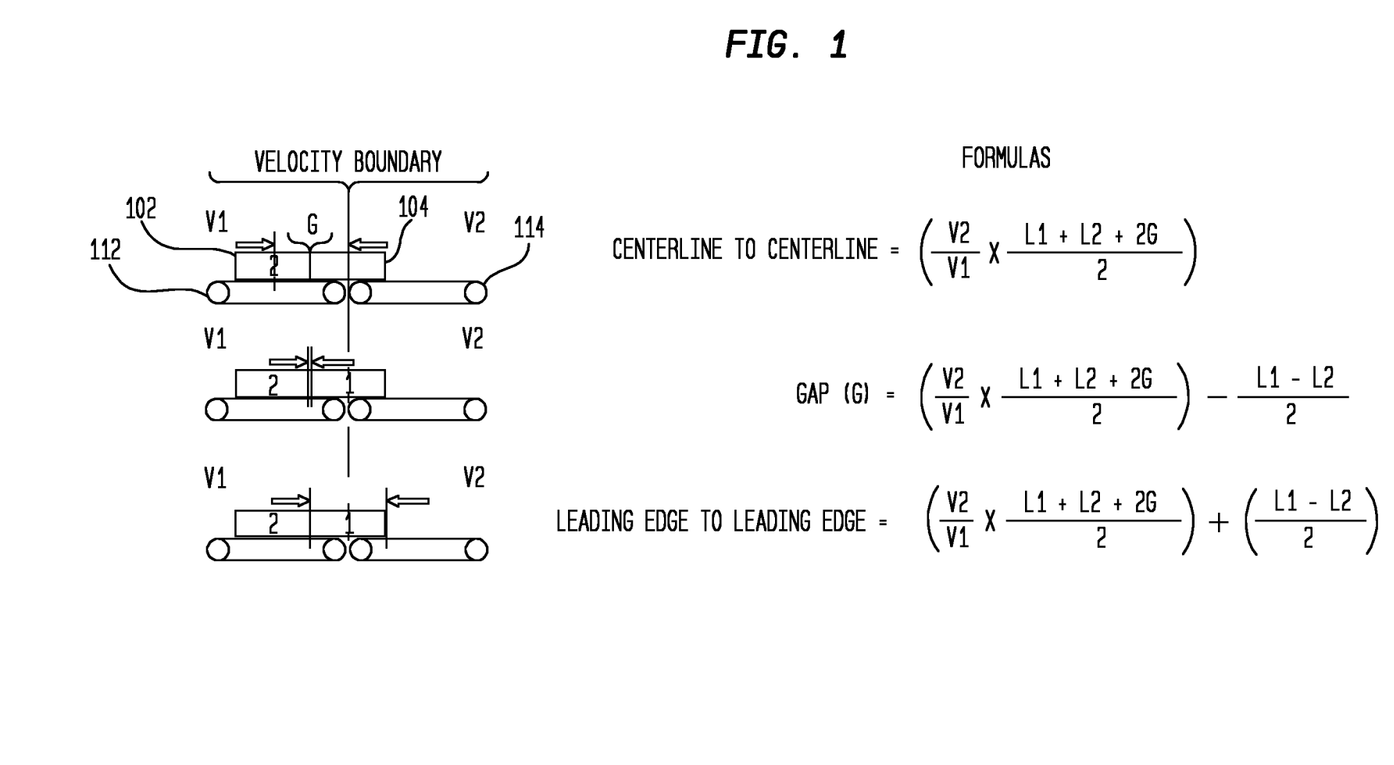
FIG. 1 illustrates an example of an apparatus and system in accordance with disclosed embodiments.

FIG. 1 illustrates formulas for centerline, gap, and pitch. Because the length of item 102 (labeled 1) and item 104 (labeled 2) above is highly variable, the variation in the distance between the items caused by the velocity boundary is also variable. The velocity boundary is caused and can be adjusted by using different velocities of different conveyors, such as conveyors 112 and 114. This results in high variability in the throughput and gap at the output. The function of improving the consistency of throughput and gap can be implemented in a device called a "gapper." The gapper utilizes multiple stages of short conveyor sections whose speed is highly variable and controllable, creating a series of velocity boundaries as illustrated above. Varying the sequential speeds with carefully controlled timing and synchronization and corresponding to the items being processed allows timing between items to be made more consistent and in line with the desired goal, such as fixed pitch or fixed gap.

This regulation process represents a zero-sum game of sorts, in that the total length of items being processed and the total interval between those items are constant. Therefore, to increase a specific gap interval, gap elsewhere must be decreased and shifted across the sequence. Even when a gapper is attempting to regulate to the mode in distribution, the standard deviation in gap determines how many sequential items distant the system would have to extend to potentially achieve regulation. Distribution thereby determines the distance and number of items in a sequence across which the system is attempting to regulate. This distance and number of items is a key determining factor in the number of velocity boundaries and gapper sections required to regulate a system.

Gapper sections increase the cost of the system, and even in the ideal system, with what would theoretically be enough gapper sections to accommodate distribution in the interval between items, dynamic limitations of the system (to impart acceleration or deceleration to individual items in sequence and thus shift interval across the sequence) reduce actual efficiency and accuracy. The ideal system would solve the inherent limitation in the zero-sum game that the system represents.

Disclosed embodiments can continuously monitor the items being transported prior to the gapper and provide a means of controlled extraction and recirculation of specific items from the stream prior to the gapper, making it possible to precondition the flow of items into the gapper for improved gapping consistency.

Figure 2:
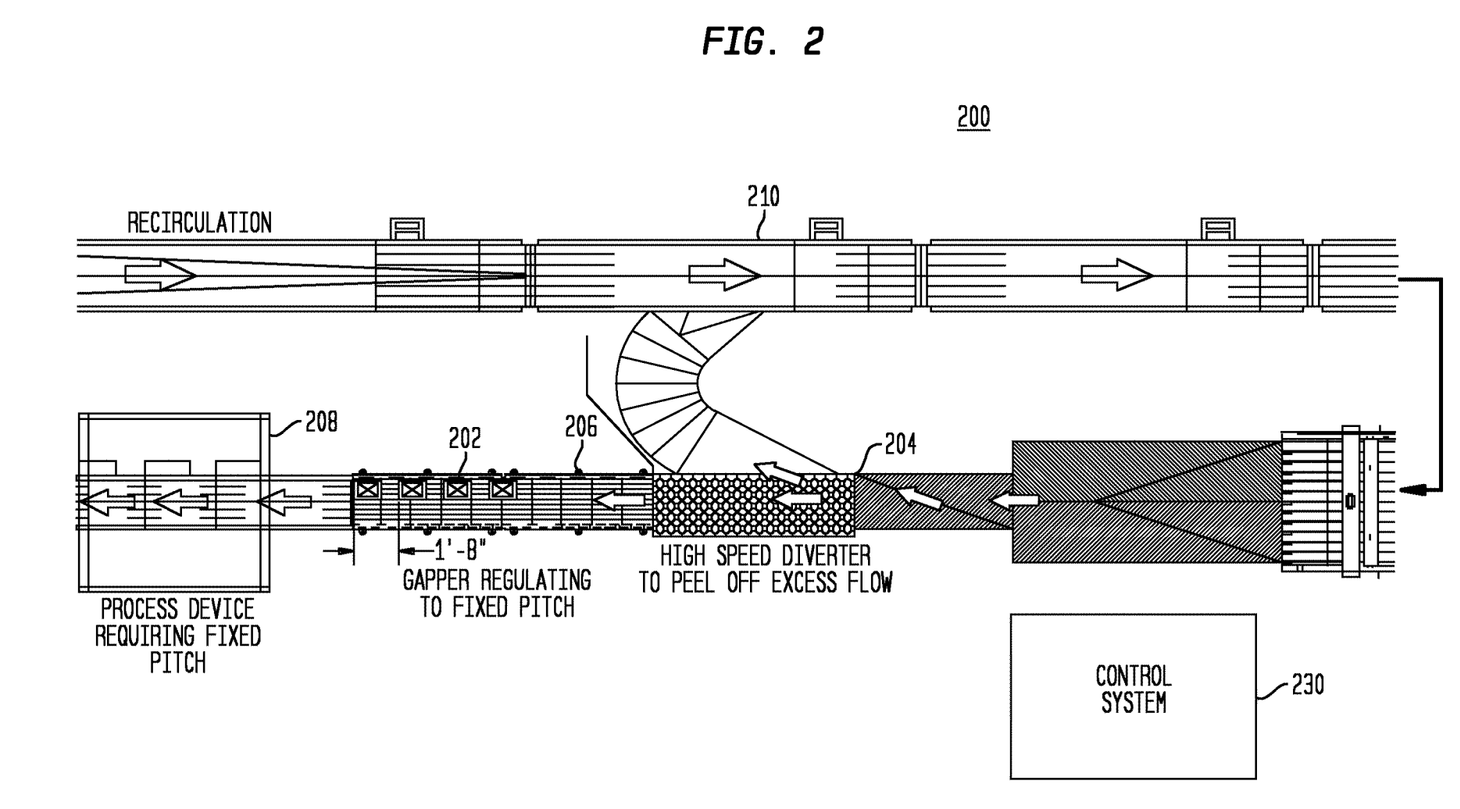
FIG. 2 illustrates extraction and recirculation in accordance with disclosed embodiments.

FIG. 2 illustrates a parcel processing system 200 with extraction and recirculation at a device labeled "High Speed Diverter," in accordance with disclosed embodiments. Transport 210 receives parcel 202 and transports them between various processing devices, including other devices not necessary for this illustration.

In this illustration, as parcels 202 are being transported, before they reach gapper 206, the control system 230 can determine when the rate of the flow of parcels is greater than can be gapped to match the synchronization requirement of process device 208. The control system can cause high speed diverter 204 to divert some of the parcels as necessary back to transport 210 for recirculation. The "synchronization requirement" can refer to a fixed processing rate, a fixed pitch of the flow of parcels, a fixed gap for the flow of parcels, or otherwise. Note that the synchronization requirement for a device that has such a requirement can influence or define the processing capacity of that device.

Other parcels 202 move to gapper 206 which (in this example) adjusts the spacing of the parcels 202 to a fixed pitch or gap. After the pitch or gap has been adjusted by the gapper 206, parcels 202 are conveyed to process device 208 that requires synchronization in the provision of parcels as described herein. Control system 230 can control each of the elements of parcel processing system 200 to perform the processes as described herein.

While the parcel processing system 200 of FIG. 2 is simplified for purposes of illustration, in various embodiments, parcel processing system 200 can include any other physical systems or devices for transporting, sorting, singulating, stacking, tracking, scanning, imaging, or performing other processes on parcels 202.

Through selective extraction the system breaks the zero-sum game model, and is able to increase the total interval in the sequence of items beyond what had been a constant total interval. Further, the interval can be injected into the system in proximity to the specific interval in which additional interval provides optimal benefit. In a system that can create or increase interval dynamically prior to gapping by selective extraction, it is advantageous to input a higher rate than would otherwise be necessary to reduce the instances in which more interval exists in the gapper than can be regulated.

In other words, a higher item input rate prevents having too much gap distance and not enough item distance. Items that are extracted to create interval are recirculated and then merged to a point prior to singulation and regulation, such as a bulk flow conveyor that is feeding the singulator. While the items that are recirculated are processed more than one time, the overall process is more efficient in ways that significantly improve productivity.

Control of regulation is therefore a combination of the gapping and extraction functions, based on upstream sensor inputs and calculations to identify the items to be extracted, based on analysis of the sequence of items, including their length and interval. One means of identifying the item to be extracted and the point at which interval is to be created is to integrate a simple simulation of the gapping algorithm in use so that the system can predict with reasonable accuracy what the resulting regulated intervals would be, based on the sequence of items (their length and intervals). With this simulation, multiple hypotheses can be tested to determine the optimal regulation, based on different items being extracted, and compared to no items being extracted. The optimal hypothesis is selected, which defines the item to be extracted. This process is repeated for every item in a rolling buffer of length and interval data. Such a process is independent of the algorithms used for gapping, but whatever algorithms are used, however sophisticated, it must be simulated so that different hypotheses can be tested.

In some systems, regulation of gap or pitch remains highly variable. This leads system designers to provision process devices or sorters that have strictly limited processing rates (equivalent to bandwidth) with a rate in which the maximum provided throughput (the highest possible rate) does not exceed the bandwidth of the downstream processing device or sorter. Because of the variability in the provisioning throughput, there is a significant range between the maximum and minimum throughput, inefficiently matched to the downstream processing capacity.

The resulting capacity inefficiency represents potential productivity of the sorter that is not realized. This lost productivity depends on the consistency of provisioning throughput but is thought to be as high as 20% in state-of-the-art systems.

Figure 3A:
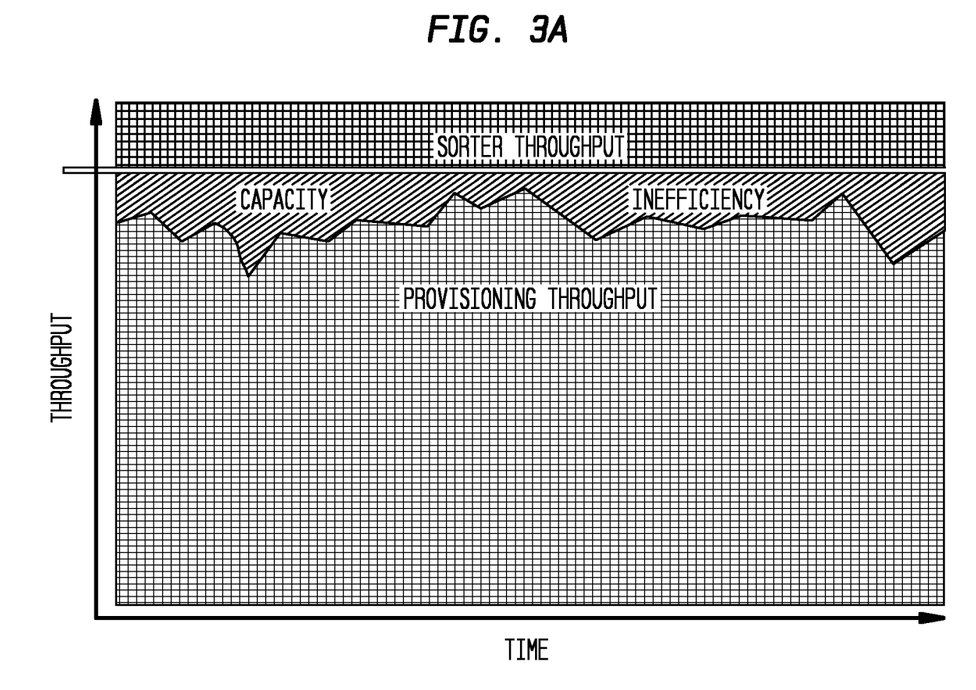
FIGS. 3A, 3B, 3C, and 3D illustrate throughput vs. time for provisioning and sorting in accordance with disclosed embodiments.
Figure 3B:
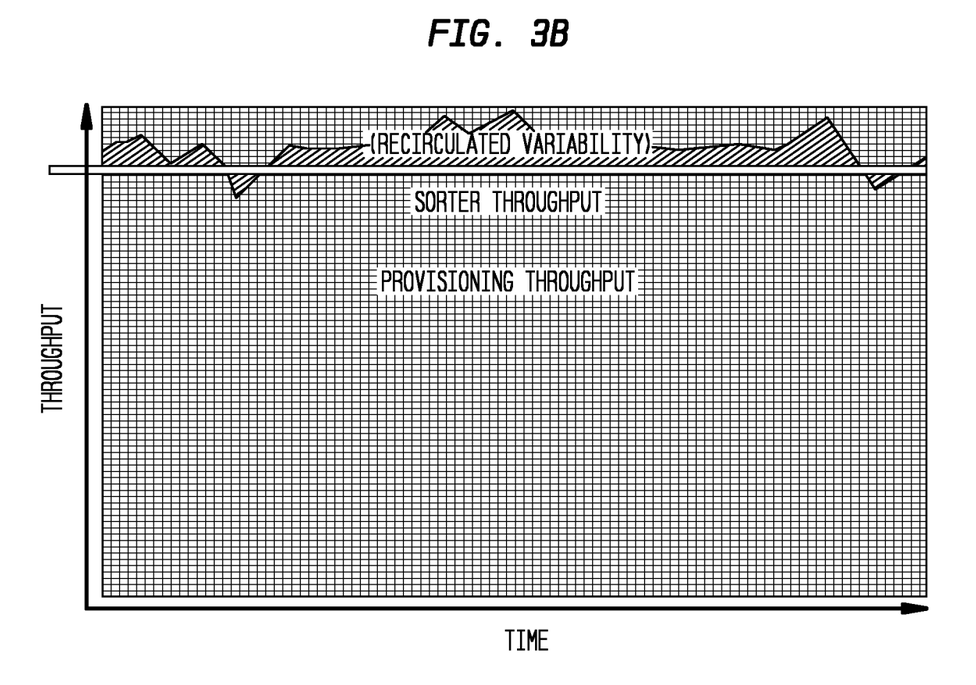
Figure 3C:
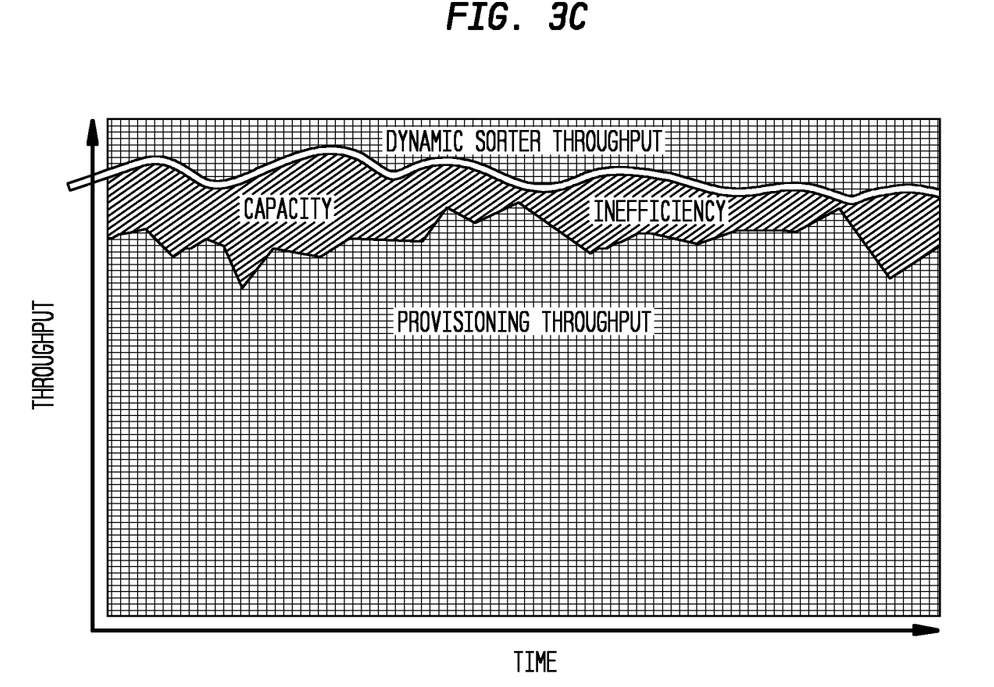

FIGS. 3A and 3C illustrate throughput vs. time for provisioning and sorting for systems that do not used extraction and recirculation as disclosed. Because the peak provisioning throughput must be kept less than the sorter throughput, the variable provisioning rate is usually less than the sorter throughput, resulting in the illustrated capacity inefficiency.

In systems and methods according to disclosed embodiments, most of this inefficiency can be captured, particularly when the minimum provisioning throughput exceeds the sorter throughput. This function of recirculating variability as disclosed herein yields the productivity as illustrated in FIGS. 3B and 3D.

Figure 3D:
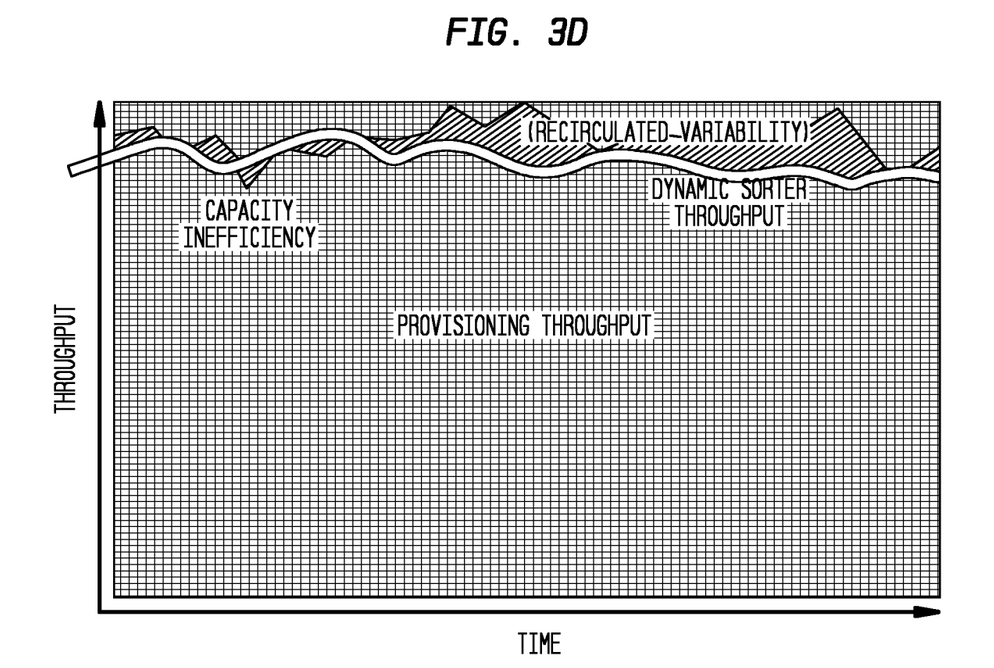

FIGS. 3B and 3D illustrate throughput vs. time for provisioning and sorting in a system as disclosed herein. Note that the provisioning throughput is maintained at a generally higher rate than the sorter throughput, relying on the extraction and recirculation processes, along with gapping processes, to match the resulting provisioning output to the sorter throughput. The "recirculated variability" represents the items that are extracted and recirculated rather than being passed directly to the sorter.

While a sorter is used in the examples of FIGS. 3A, 3B, 3C, and 3D, the same applies to any process device with processing capacity requirements as described herein.

Singulation systems, such as the SIEMENS VISICON singulator, are improved using techniques as disclosed herein where they are not capable of streaming product with sufficient accuracy in gap or pitch such that no downstream gapper is needed.

Figure 4:
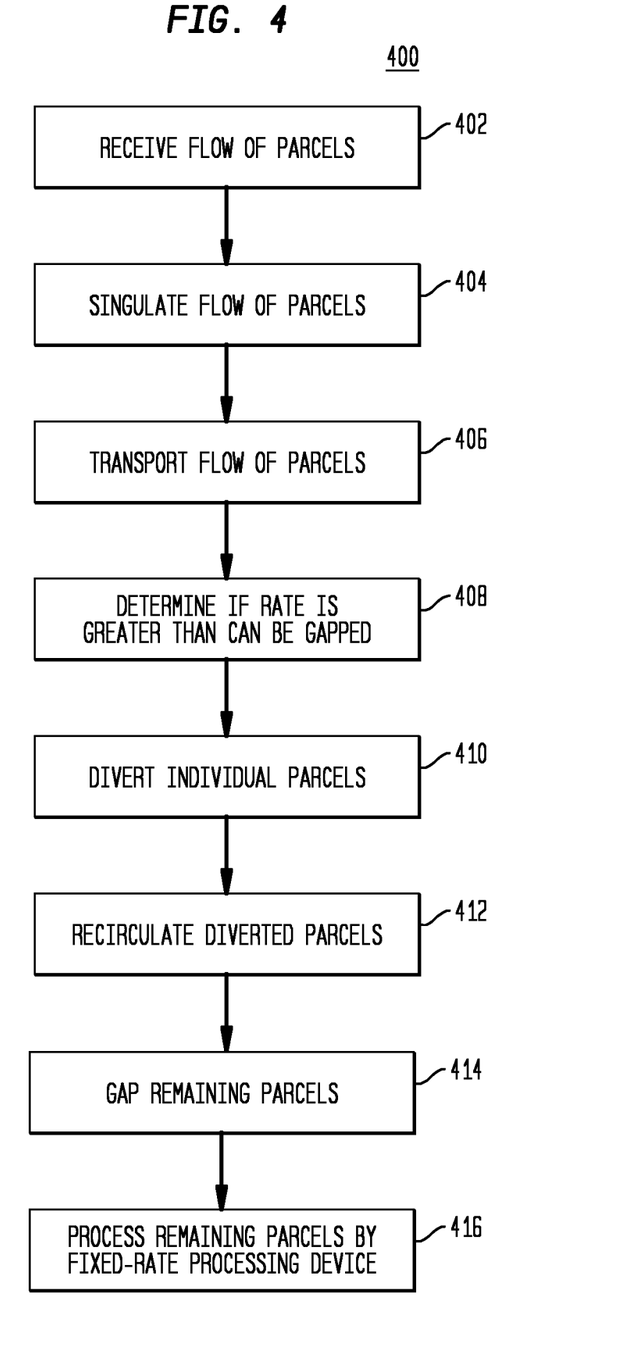
FIG. 4 illustrates a flowchart of a process in accordance with disclosed embodiments.

FIG. 4 illustrates a flowchart of a process in accordance with disclosed embodiments that may be performed by a parcel processing system as disclosed herein.

The parcel processing system receives a flow of parcels to be processed (402). The received flow of parcels can be a variable-rate flow of parcels.

The parcel processing system can singlulate the flow of parcels (404).

The parcel processing system transports the flow of parcels at a rate that is greater than the processing capacity of the processing device (406). This can accommodate for circumstances in which the rate of provision would otherwise prove to be inadequate, due to the variability of rate as described herein. The processing device can be, for example, a parcel sorter or other device. The parcel processing system determines when the rate of the flow of parcels is greater than can be gapped to match the downstream synchronization requirement (408). When gapping is not necessary, this process may be omitted.

The parcel processing system diverts individual parcels from the flow of parcels until the rate of the flow of parcels is not greater than the downstream processing capacity or that can be gapped to match the downstream synchronization requirement when gapping is performed (410).

The parcel processing system recirculates the diverted individual parcels to that they reenter the flow of parcels prior to the diverting process (412). In particular cases, the diverted individual parcels are returned to a bulk flow of parcels received at 402.

The parcel processing system can gap the remaining flow of parcels (414).

The parcel processing system processes the remaining flow of parcels by the fixed processing device (416).

While the specific examples disclosed herein include adding interval by removing items from a provisioning throughput that exceeds the throughput required downstream, other embodiments can do the opposite: provision less than the throughput requirement downstream and insert items to break the zero-sum game of the transport. Still other embodiments can merge multiple flows, adding both interval and items to reduce the variability, thus simplifying the gapping problem.

Figure 5:
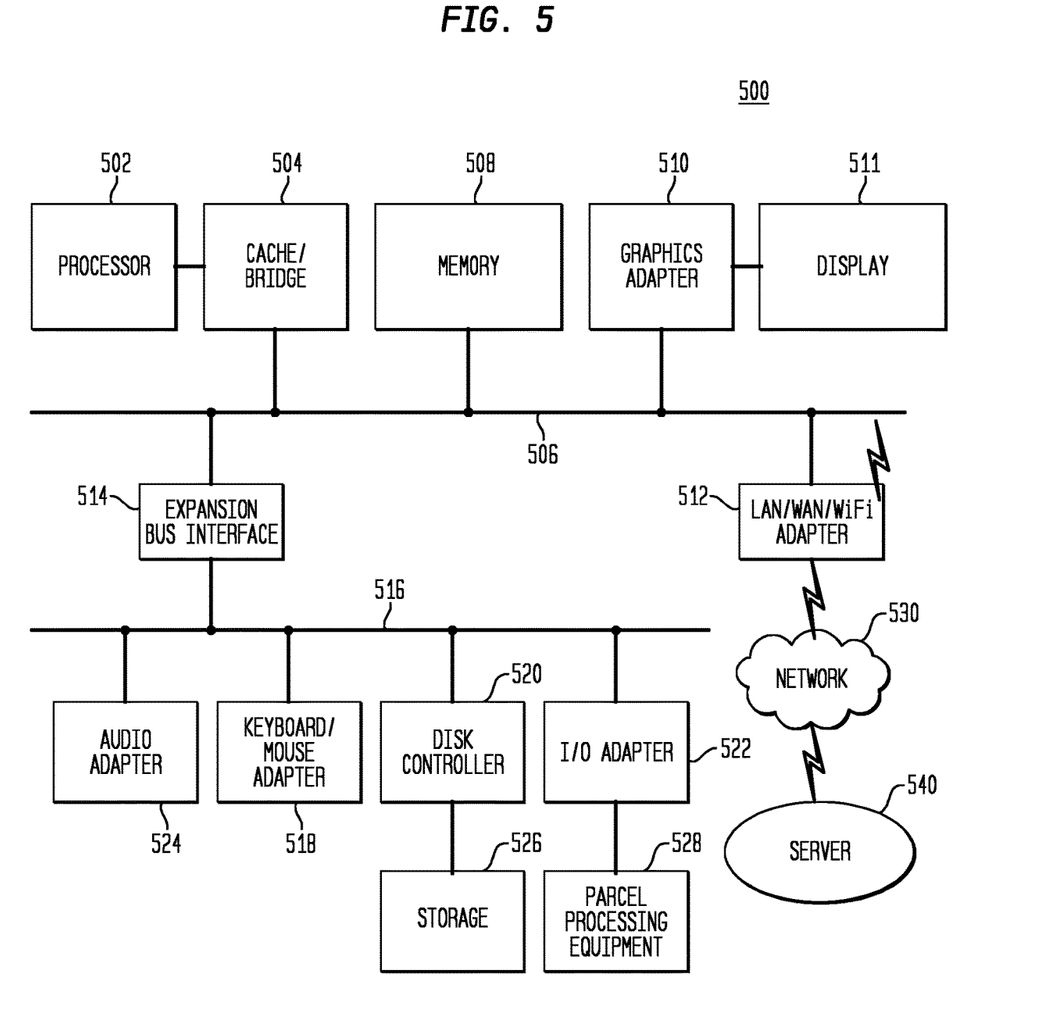
FIG. 5 depicts a block diagram of a data processing system with which an embodiment can be implemented.

FIG. 5 depicts a block diagram of a data processing system 500 with which an embodiment can be implemented, for example as a system for implementing any of the devices, methods, or systems described herein, and can be configured to perform processes as described herein, and in particular can be used as the control system for a parcel processing system. The data processing system depicted includes a processor 502 connected to a level two cache/bridge 504, which is connected in turn to a local system bus 506. Local system bus 506 may be, for example, a peripheral component interconnect (PCI) architecture bus. Also connected to local system bus in the depicted example are a main memory 508 and a graphics adapter 510. The graphics adapter 510 may be connected to display 511.

Other peripherals, such as local area network (LAN)/Wide Area Network/Wireless (e.g. WiFi) adapter 512, may also be connected to local system bus 506. Expansion bus interface 514 connects local system bus 506 to input/output (I/O) bus 516. I/O bus 516 is connected to keyboard/mouse adapter 518, disk controller 520, and I/O adapter 522. Disk controller 520 can be connected to a storage 526, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 522 can be connected to control or communicate with parcel processing equipment 528, which can include transport devices or conveyors, sensors, booms, sorters, gappers, singulators, diverters, recirculators, or any other hardware disclosed herein or other hardware devices for processing parcels in accordance with the various embodiments described herein.

Also connected to I/O bus 516 in the example shown is audio adapter 524, to which speakers (not shown) may be connected for playing sounds. Keyboard/mouse adapter 518 provides a connection for a pointing device (not shown), such as a mouse, trackball, trackpointer, etc.

Those of ordinary skill in the art will appreciate that the hardware depicted in FIG. 5 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 512 can be connected to a network 530 (not a part of data processing system 500), which can be any public or private data processing system network or combination of networks, as known to those of skill in the art, including the Internet. LAN/WAN/Wireless adapter 512 can also communicate with packages as described herein, and perform other data processing system or server processes described herein. Data processing system 500 can communicate over network 530 with one or more server systems 540, which are also not part of data processing system 500, but can be implemented, for example, as separate data processing systems 500. A server system 540 can be, for example, any of the other systems described herein, and so indicates how systems can intercommunicate over network 530.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A parcel processing system comprising:
  a parcel transport configured to:
    receive a flow of parcels, and
    transport the flow of parcels at a rate greater than the processing capacity of a downstream processing device;
  a diverter configured to divert individual parcels from the flow of parcels to be recirculated;
  the downstream processing device configured to process the remaining flow of parcels;
  a control system configured to:
    cause the diverter to divert the individual parcels from the flow of parcels until the remaining flow of parcels is not greater than the processing capacity of the downstream processing device;
  the parcel processing system further comprising a gapper configured to gap the remaining flow of parcels to match a downstream synchronization requirement, wherein the control system is further configured to cause the diverter to divert the individual parcels from the flow of parcels until the remaining flow of parcels is not greater than can be gapped to match the downstream synchronization requirement.

2. The parcel processing system of claim 1, wherein the downstream processing device is a parcel sorter.

3. The parcel processing system of claim 1, wherein the processing capacity of the downstream processing device is defined by a downstream synchronization requirement that is one of a fixed pitch of the flow of parcels or a fixed gap for the flow of parcels.

4. The parcel processing system of claim 1, wherein the control system is further configured to determine when the flow of parcels is greater than can be gapped to match the downstream processing capacity.

5. The parcel processing system of claim 1, further comprising a singulator configured to singulate the flow of parcels.

6. The parcel processing system of claim 1, wherein the received flow of parcels is a variable-rate flow of parcels.

7. A parcel processing method performed by a parcel processing system, comprising:
receiving a flow of parcels to be processed at a parcel transport;
transporting the flow of parcels at a rate of the flow of parcels that is greater than the processing capacity of a downstream processing device;
diverting individual parcels from the flow of parcels, by a diverter, until the rate of the flow of parcels is not greater than the processing capacity of the downstream processing device;
recirculating the diverted individual parcels to that they reenter the flow of parcels prior to the diverting;
processing the remaining flow of parcels by the downstream processing device;
the parcel processing method further comprising diverting individual parcels from the flow of parcels, by the diverter, until the rate of the flow of parcels is not greater than can be gapped to match a downstream synchronization requirement.

8. The parcel processing method of claim 7, further comprising determining when the rate of the flow of parcels is greater than can be gapped to match the processing capacity of the downstream processing device.

9. The parcel processing method of claim 7, further comprising gapping the remaining flow of parcels.

10. The parcel processing method of claim 7, wherein the downstream synchronization requirement is one of a fixed pitch of the flow of parcels, or a fixed gap for the flow of parcels.

11. The parcel processing method of claim 7, wherein the downstream processing device is a parcel sorter.

12. The parcel processing method of claim 7, wherein the received flow of parcels is a variable-rate flow of parcels.

13. A non-transitory computer-readable medium storing executable instructions that, when executed, cause a control system of a parcel processing system to control the parcel processing system to:
receive a flow of parcels to be processed at a parcel transport;
transport the flow of parcels by the parcel transport at a rate of the flow of parcels that is greater than the processing capacity of the downstream processing device;
divert individual parcels from the flow of parcels, by a diverter, until the rate of the flow of parcels is not greater than the processing capacity of the downstream processing device;
recirculate the diverted individual parcels to that they reenter the flow of parcels prior to the diverting;
process the remaining flow of parcels by the downstream processing device;
the non-transitory computer-readable medium further comprising instructions to divert individual parcels from the flow of parcels, by the diverter, until the rate of the flow of parcels is not greater than can be gapped to match a downstream synchronization requirement.

14. The non-transitory computer-readable medium of claim 13, further comprising instructions to determine when the rate of the flow of parcels is greater than can be gapped to match the processing capacity of the downstream processing device.

15. The non-transitory computer-readable medium of claim 13, further comprising instructions to synchronize the remaining flow of parcels.

16. The non-transitory computer-readable medium of claim 13, wherein the processing capacity of the downstream processing device is defined by a downstream synchronization requirement that is one of a fixed pitch of the flow of parcels or a fixed gap for the flow of parcels.

17. The non-transitory computer-readable medium of claim 13, wherein the downstream processing device is a parcel sorter.

* * * * *